(12) United States Patent
Kennedy

(10) Patent No.: US 9,404,416 B2
(45) Date of Patent: Aug. 2, 2016

(54) GENERATOR COMPRESSOR COMBINATION POWER SYSTEM

(71) Applicant: Gino Kennedy, Jacksonville, FL (US)

(72) Inventor: Gino Kennedy, Jacksonville, FL (US)

(*) Notice: Subject to any disclaimer, the term of this patent is extended or adjusted under 35 U.S.C. 154(b) by 493 days.

(21) Appl. No.: 13/847,354

(22) Filed: Mar. 19, 2013

(65) Prior Publication Data
US 2013/0247573 A1 Sep. 26, 2013

Related U.S. Application Data

(60) Provisional application No. 61/613,300, filed on Mar. 20, 2012.

(51) Int. Cl.
| | | |
|---|---|---|
| *F02B 63/04* | (2006.01) | |
| *F02B 63/06* | (2006.01) | |
| *B23K 9/10* | (2006.01) | |
| *F01D 15/10* | (2006.01) | |

(52) U.S. Cl.
CPC ............ *F02B 63/04* (2013.01); *F02B 63/06* (2013.01); *B23K 9/1006* (2013.01); *F01D 15/10* (2013.01); *F02B 63/041* (2013.01); *F02B 63/042* (2013.01); *F02B 63/043* (2013.01); *F02B 63/044* (2013.01)

(58) Field of Classification Search
CPC .............. F02B 63/04–63/044; F01D 5/10; B23K 9/1006
See application file for complete search history.

(56) References Cited

U.S. PATENT DOCUMENTS

| | | | | |
|---|---|---|---|---|
| 5,880,571 | A * | 3/1999 | Seffernick et al. | 318/773 |
| 6,009,265 | A * | 12/1999 | Huang | G06F 17/30445 |
| 6,666,027 | B1 * | 12/2003 | Cardenas, Jr. | 60/772 |
| 6,784,560 | B2 * | 8/2004 | Sugimoto | F02B 63/04 123/2 |
| 2004/0182846 | A1 * | 9/2004 | Silvestro | B23K 9/1006 219/133 |
| 2005/0155959 | A1 * | 7/2005 | Bender | B23K 9/1006 219/133 |
| 2007/0267870 | A1 * | 11/2007 | Ambrose | B23K 9/323 290/1 A |
| 2009/0008374 | A1 * | 1/2009 | Fosbinder | B23K 9/10 219/130.21 |
| 2011/0049891 | A1 * | 3/2011 | Bedrine et al. | 290/46 |

FOREIGN PATENT DOCUMENTS

| | | |
|---|---|---|
| WO | WO2004107534 | 12/2004 |
| WO | WO2005101617 | 10/2005 |

* cited by examiner

*Primary Examiner* — Craig Kim
(74) *Attorney, Agent, or Firm* — McHale & Slavin, P.A.

(57) ABSTRACT

Disclosed is a generator compressor combination power system based upon an internal combustion engine directly coupled to a generator and a compressor assembly. The engine, generator and compressor each having an operating drive shaft all positioned along the same axis, the generator is used to produce electricity and the compressor is used to compress gas.

4 Claims, 4 Drawing Sheets

GENERATOR COMPRESSOR COMBINATION POWER SYSTEM

PRIORITY CLAIM

In accordance with 37 C.F.R. 1.76, a claim of priority is included in an Application Data Sheet filed concurrently herewith. Accordingly, the present invention claims priority under 35 U.S.C. §119(e), 120, 121, and/or 365(c) to U.S. Provisional Application No. 61/613,300, entitled "ENGINE, GENERATOR AND COMPRESSOR ARRANGEMENT", filed Mar. 20, 2012. The contents of which the above referenced application is incorporated herein by reference.

FIELD OF THE INVENTION

This invention relates to the field of spray application equipment and in particular to engine driven generators and compressors for use in spray foam and spray coating applications.

BACKGROUND OF THE INVENTION

Equipment used in air spray applications, such as spray foaming and spray coatings, typically require electricity for operation of various components such as heating elements, pumps and an air compressor. If the equipment is portable, electricity is provided by an engine driven generator. If portable, the components must be compact enough to transportation and are typically placed within the limited space of a trailer. For purposes of illustration, spray foam applications will be discussed but the application of the instant invention can be applied to spray coatings or wherein portable equipment is necessary for the generation of pressurized air, including oil fields. For illustration purposes the use of spray foam for insulating materials may be recognized. The use of spray foam can stop air and moisture infiltration, add strength to the building structure, provides an insulator that is permanent and will not sag, reduce the capacity requirements of HVAC, provide sound proofing, and so forth. Sprayed polyurethane foam has an aged R-value of approximately 6 per 1 inch thickness. Traditional fiberglass insulation is only stapled so it is difficult to fill cracks and uneven surfaces. Further, attachment of fiberglass insulation to metal surfaces is most impractical. Sprayed polyurea is an elastomer used in coatings of large surfaces such as tank liners, manhole and tunnel coatings, truck bed liners, and so forth.

Typically a foaming application includes an on-board power output generator for providing power to electrical consuming items. In this application the largest electrical consuming item is the compressor used for generating compressed air for creation of the foam product and application thereof. Onboard generators must be sufficiently large enough to simultaneously provide all the power needed to the foaming system, including the power to run the electric motor of the air compressor. Further, such electric motors have a high amp draw upon start-up wherein the generator must be sized to address the start-up amperage draw.

The application of the electric driven compressor typically requires an oversized generator to accommodate the start-up of the compressor motor. The generator must be sized to accommodate the start-up amps which may be 4-5 times the operating amp load. The larger generator adding cost and weigh. Piston compressors wear out quickly and need a tank. Rotary screw compressors run at a high speed and are noisier due to belt noise and more vibration. A disadvantage of these known motor driven systems is the need to provide a suitable coupling apparatus between the motor and the compressor to compensate for speed differential to maintain alignment and adjust for the proper rotational speed. Additionally, a known belt driven system requires a heavy base plate.

Another problem with the prior art is the sizing of an engine and generator motor, the start-up amps of the electric motor and ancillary items must be considered to prevent over taxing of the engine during startup. Finally, the amount of space consumed by a freestanding compressor must be addressed especially in those instances where portability is of concern.

WO2004/107534 discloses the combination of a pump and a compressor, powered by a single electric motor, by means of two freewheel bearings. More in detail, the motor is provided with a selector that reverses its rotation direction and the pump and the compressor are connected to the motor shaft respectively by a first and a second freewheel bearing, with an opposite engaging direction. Motion is then transmitted to the pump or the compressor by reversing motor rotation.

WO2005/101617 discloses a modified electric motor, providing it with two completely independent shafts, each connected to the rotor by means of a freewheel bearing. The shafts are protruding from opposite sides of the motor, which is thus located centrally between the two operating machines; the latter, as in the previous case, may be a pump and a compressor, or a pump and an aspirator.

The known prior art fails to disclose a generator compressor combination power system that provides an efficient system for producing electricity and compressed air. The generator compressor combination power system can be used for most any application. For instance, during construction a contractor needs access to electricity for operating of lights, electric driven power tools, heaters, air conditioners, electric pumps and so forth. Similarly, the need for compressed air for operation of pneumatic driven power tools, pneumatic pumps and so forth. Many such locations are temporary and so remote that electric land lines are impractical, such as certain oil field operations. Other installations need power systems to set up the land line systems. Yet another example is the use with any spray coating applications which are typically temporary in design. Still others need 100% back-up power systems. Previous known prior art power systems include the use of a belt driven piston type compressor operating at 800 to 1000 rpms or a belt driven rotary screw compressor operating at 4000 to 6000 rpms, all of which have to have engine generator combinations sized to handle the large startup amps of the compressor.

SUMMARY OF THE INVENTION

Disclosed is a generator compressor combination power system based upon a direct coupled engine/generator, together with a compressor. The engine is a conventional internal combustion engine having a horizontally disposed output shaft. The engine is attached to an electric generator wherein the output shaft of the engine is directly coupled to an input shaft to the generator. A compressor is directly coupled to the output shaft of the generator or another output shaft of the engine.

The generator and compressor is rotated by the engine at 1800 rpm's or 3600 rpm's wherein the generator will produce electricity and the compressor pneumatic pressured air in the ordinary and conventional manner. Direct coupling of the compressor eliminates the need for a separate compressor drive motor, bed plate, and associated inter connecting hardware. In the preferred embodiment, the operational speed of the engine matches the generator and the compressor.

An objective of the invention is to disclose a generator compressor combination power system having an engine for driving a generator to produce electricity, and a compressor to provide pressurized air.

Another objective of the invention is to disclose a rotary vane compressor that is directly driven off the engine or generator eliminating the need for bed plates, coupling belts, and the need for a electric motor for the compressor.

Another objective of the invention is to disclose a power system for use with spray applications.

Still another objective of the invention is to disclose a power system that provides a stable voltage and eliminates the start-up amperage draw that may otherwise shock the generator by creating a corrupted sine wave and frequency, or over tax the engine.

Still another objective of the invention is to disclose a generator and compressor that are directly coupled but may include a clutch between the components.

In order to facilitate a better understanding of this specification and as an integral part thereof, a series of figures is attached in which the objectives of the invention have been represented by way of illustration but are non-limiting.

DETAILED DESCRIPTION OF THE INVENTION

The instant invention proposes a new architecture for a generator compressor combination power system by use of an internal combustion engine directly coupled to an electric generator, which is also directly coupled to a compressor to permit a specific task of generating electricity and pneumatic pressure.

Figure 1:
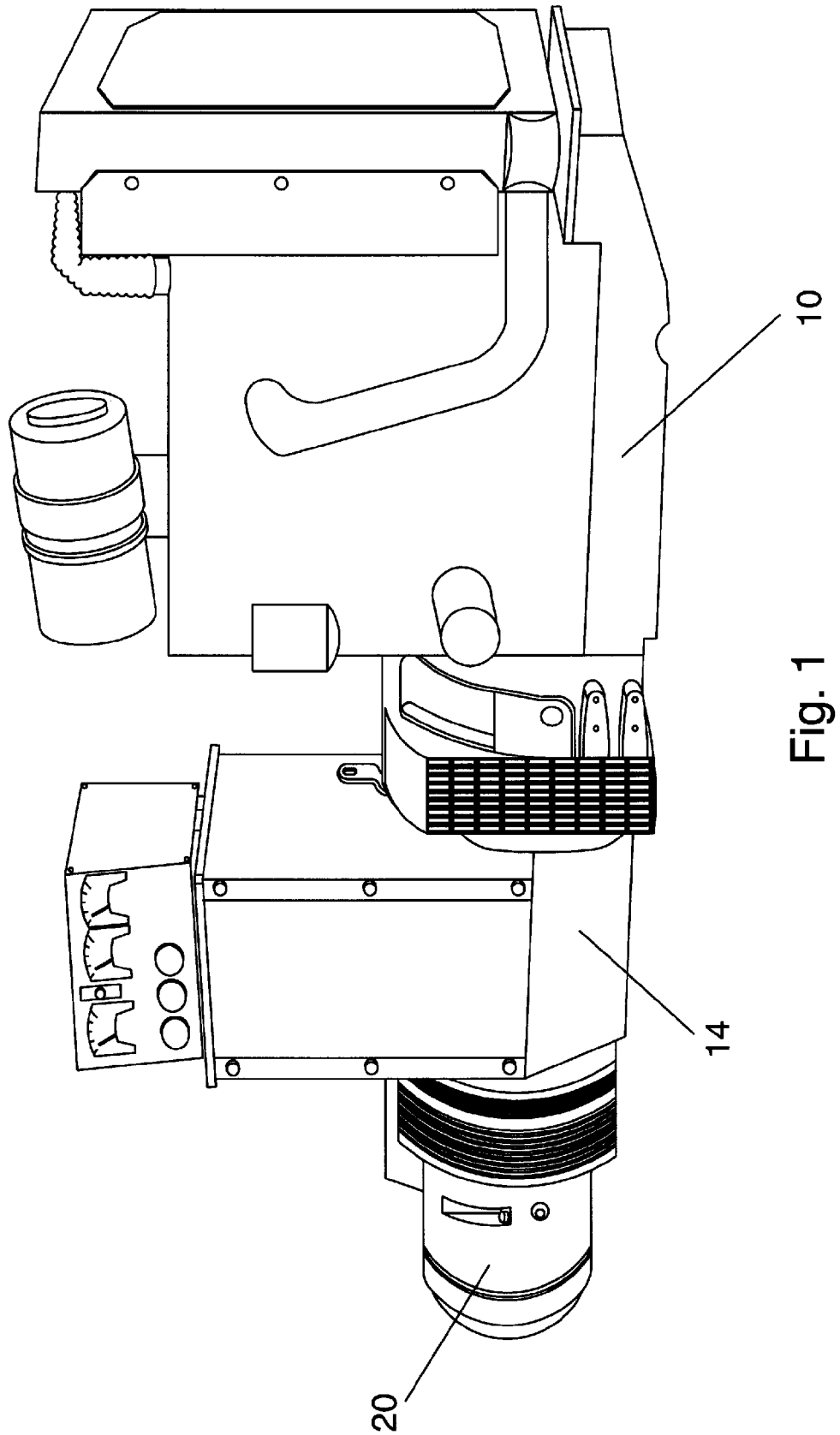
FIG. 1 is a pictorial illustration of an engine, generator, and compressor series combination.
Figure 2:
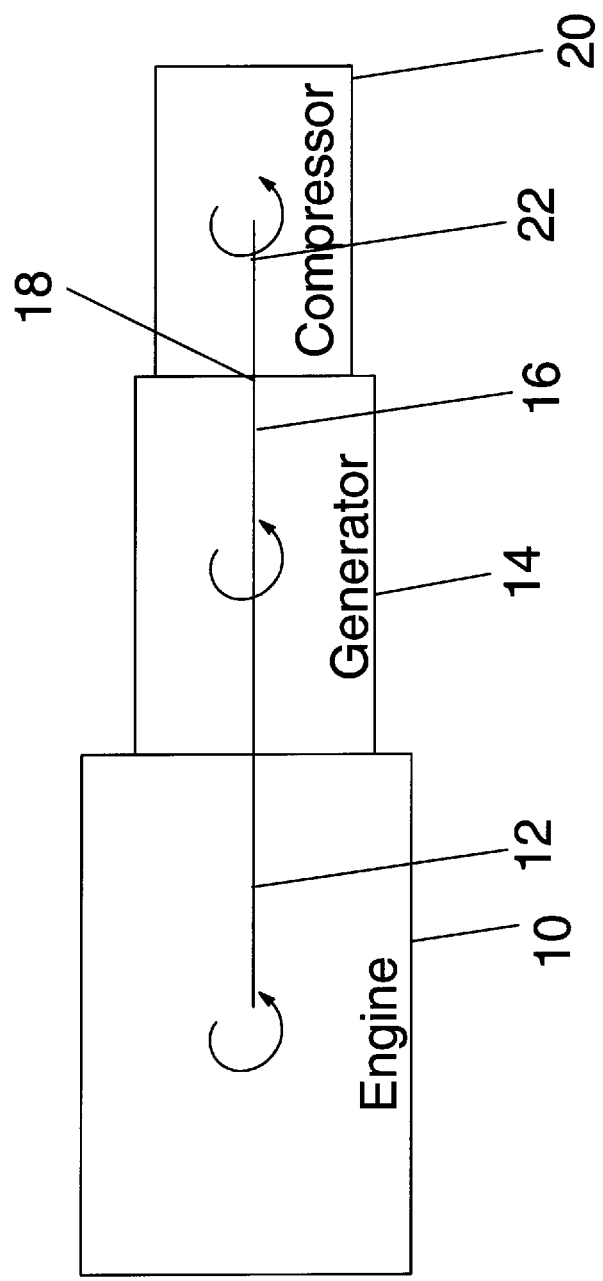
FIG. 2 is a line illustration of an engine, generator, and compressor series combination.

Referring to FIG. 1, set forth is a pictorial of the first embodiment of the invention. Engine 10 is a conventional internal combustion engine attached to the electric generator 14 and directly coupled to the compressor 20. Referring to FIG. 2, set forth is a first embodiment of the invention. Engine 10 is a conventional internal combustion engine having a horizontally disposed output shaft 12. The engine 10 is attached to a four pole electric generator 14 wherein the output shaft 12 is directly coupled to an input shaft 16 of a four pole electric generator 14. It should be noted that the generator could also be a two pole, the variation of which is typically dependent upon the rotational speed of the engine. Further, the generator can be a variable speed generator.

In one embodiment, the input shaft of the electric generator is rotated by the engine at about 1800 rpm wherein the electric generator will produce electricity in the ordinary and conventional manner. The direct coupling of an engine to a generator is novel to the applicant having been awarded previous patents on the subject matter in U.S. Pat. Nos. 5,765,805; 6,119,638; 6,047,942; 6,677,684; and 6,756,693, the contents of which are incorporated herein by reference. In this embodiment, a rotary vane compressor 20 having an input shaft 22 is directly coupled to an output shaft 18 of the electric generator 14. The use of a rotary vane compressor 20 allows low rpm operation of the compressor to match the optimal operational speed of a internal combustion engine which is also operating at 1800 rpm. The rotary vane compressor allows continuous operation without overload thereby allowing either the compressor or generator to be run continuously without the need for loading, wherein the generator can produce power independently or in combination with the compressor providing pneumatic pressures. An example of a preferred rotary vane compressor is manufactured by Hydrovane, Mattie, or the like.

Unique to the direct attachment is the space saving arrangement and the ability to eliminate the use of a compressor with a separate drive motor and the ancillary start up amperage required by such a combination. The internal combustion engine is directly coupled to the generator and the compressor; the engine, generator and compressor having an operating drive shaft all positioned along the same axis.

In the disclosed embodiment, the compressor 20 start-up is now at the same time as the engine 10 start-up. Electricity demand is lowest upon start-up as the electric motor will not produce a usable loading until the 1800 rpm rotation is obtained.

For example, spray foam applications based upon polyurethane is made by mixing and reacting materials very quickly, expanding them on contact to create a foam material. Basically, two liquids combine during a chemical reaction to form a foam. In particular, methylene diphenyldiisocyanate and polymeric methylene diphenyldiisocyanate is blended with polyols, catalysts, blowing agent, flame retardants and surfactants. The ingredients and the properly sized pumping system and compressor serve in the creation of bubbles to form cells which optimize insulating characteristics.

For the functioning mode for generation of pneumatic power and electric power, the generator compressor combination power system is capable of generating pneumatic both by use of a single output shaft, or the direct coupling of shafts between the engine, compressor and electric motor. As with a conventional generator, operation of the electric motor without loading is not detrimental to its operation. Similarly, operation of a compressor without a load is not detrimental to its operation.

In an alternative embodiment, the engine 10 is attached to a two pole electric generator 14 wherein the output shaft 12 is directly coupled to an input shaft 16 of the two pole electric generator 14. The input shaft of the electric generator is rotated by the engine at about 3600 rpms wherein the electric generator will produce electricity in the ordinary and conventional manner. A rotary vane or rotary screw type compressor 20 is directly coupled to the electric generator motor for production of compressed air.

Figure 3:
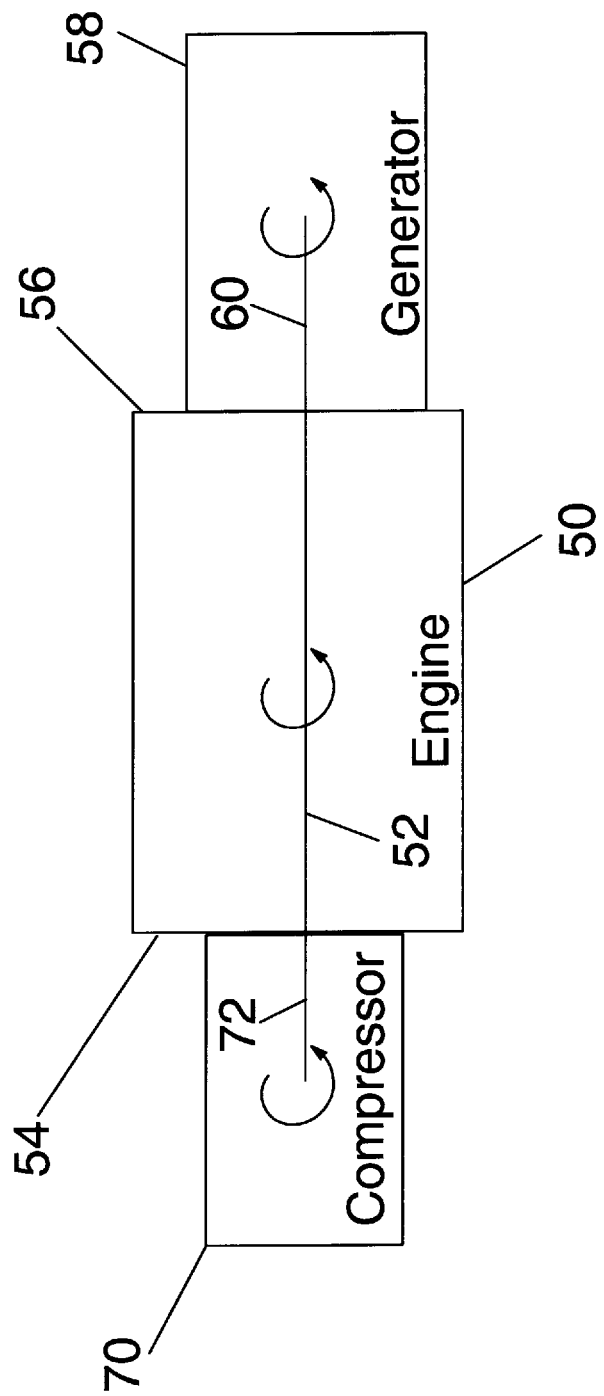
FIG. 3 is a line illustration of a compressor, engine, and generator series combination.

FIG. 3 sets forth another embodiment of the invention wherein engine 50 is a conventional internal combustion engine having a horizontally disposed output shaft 52 extending outward from the front 54 and the rear 56 of the engine. The engine 50 is attached to an electric generator 58 wherein the output shaft 52 is directly coupled to an input shaft 60 of the electric generator. The input shaft 60 of the electric generator is rotated by the engine at about 1800 rpms wherein the electric generator will produce electricity in the ordinary and conventional manner. In this embodiment, a rotary vane compressor 70 having an input shaft 72 is directly coupled to an output shaft 52 of the engine 50 along front face 54. The use of a rotary vane compressor 70 allows operation of the compressor to match the operational speed of the internal combustion engine 50 which is also operating at 1800 rpm.

Figure 4:
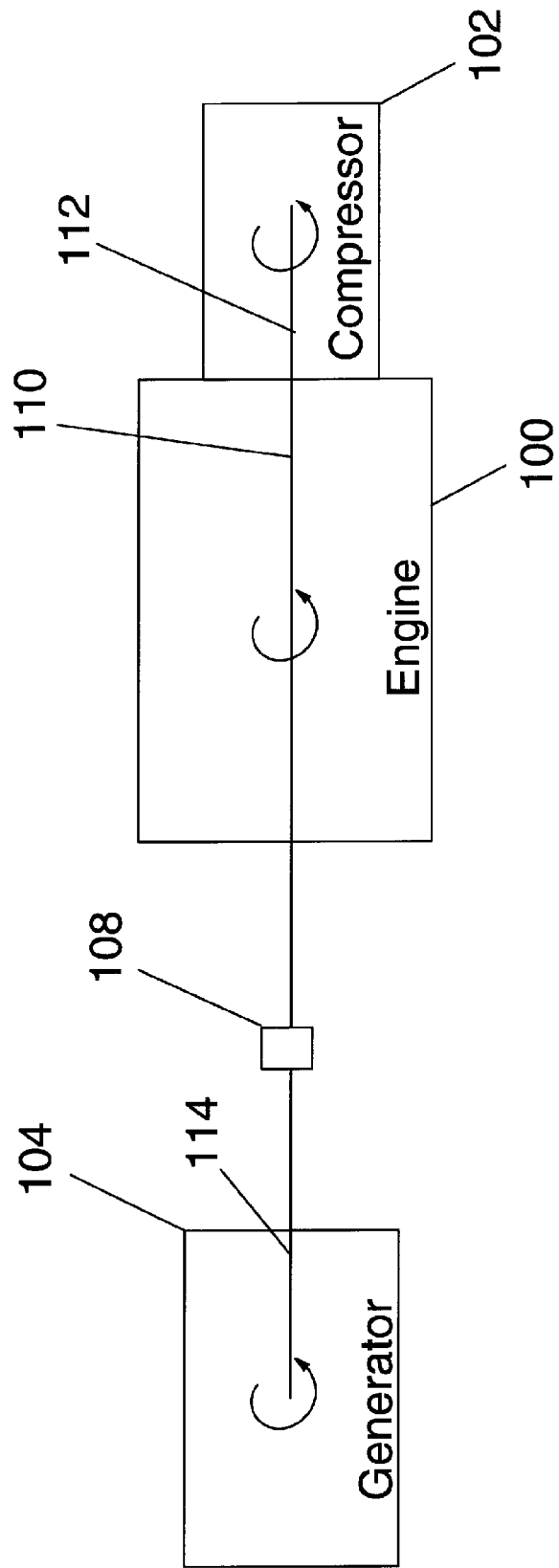
FIG. 4 is a line illustration of a generator, engine and a compressor series combination.

Referring now to FIG. 4, set forth is another embodiment wherein an electric generator 104 with a horizontally disposed input shaft 114 is coupled to engine 100 through horizontally disposed output shaft 110 through coupling 108. Engine 100 output shaft 110 is directly coupled to input shaft 112 of compressor 102.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A generator compressor combination power system consisting of: an internal combustion engine having an output drive shaft directly coupled to a generator having an input drive shaft, said generator includes an output drive shaft directly coupled to an input drive shaft of a rotary vane compressor, said engine output drive shaft, said generator input drive shaft and output drive shaft, and said rotary vane compressor drive input shaft positioned along the same axis and rotate in the same direction and at the same rotation speed; wherein said internal combustion engine, said generator and said rotary vane compressor form a single continuous apparatus and operation of said internal combustion engine causes simultaneous and equal rotation of said generator input and output drive shafts, and said rotary vane air compressor input shaft whereby said generator produces electricity and said rotary vane compressor compresses gas.

2. The generator compressor combination power system according to claim 1 wherein said engine, said generator, and said rotary vane compressor shafts rotate at about 1800 rpm.

3. The generator compressor combination power system according to claim 1 wherein said generator is four pole.

4. The generator compressor combination power system according to claim 1 wherein said generator is variable.

\* \* \* \* \*